Feb. 2, 1932.    G. RAW    1,843,405
SEPARATION OF SOLID MATERIALS OF DIFFERENT SPECIFIC GRAVITIES
Filed April 25, 1927    11 Sheets-Sheet 2
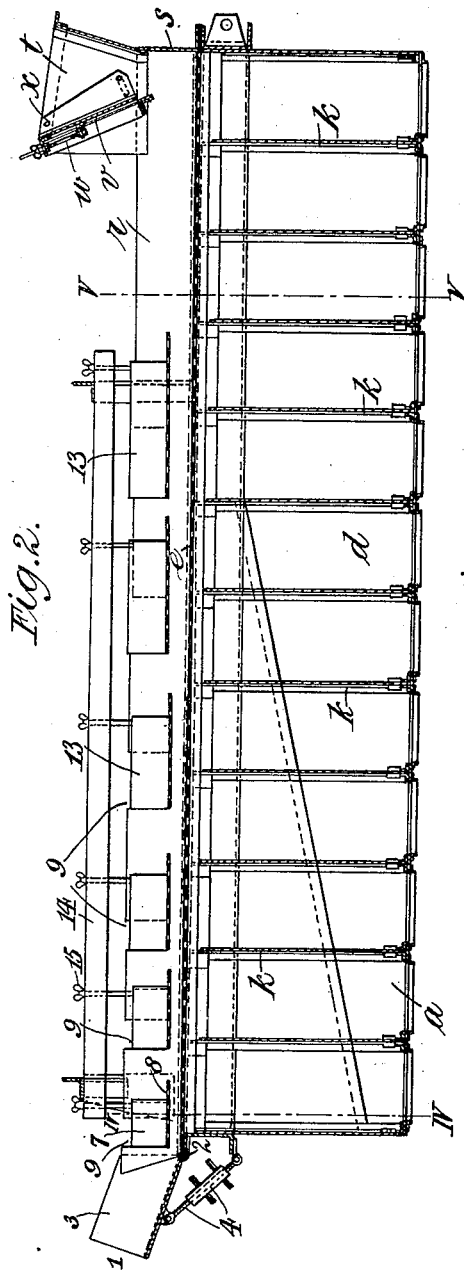
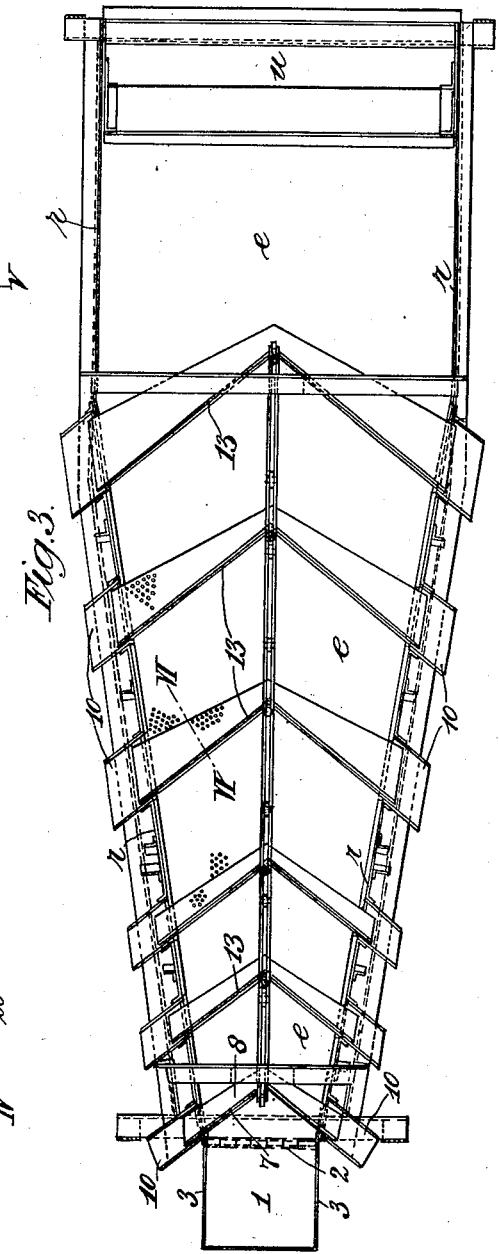
Inventor
George Raw,
By
atty.

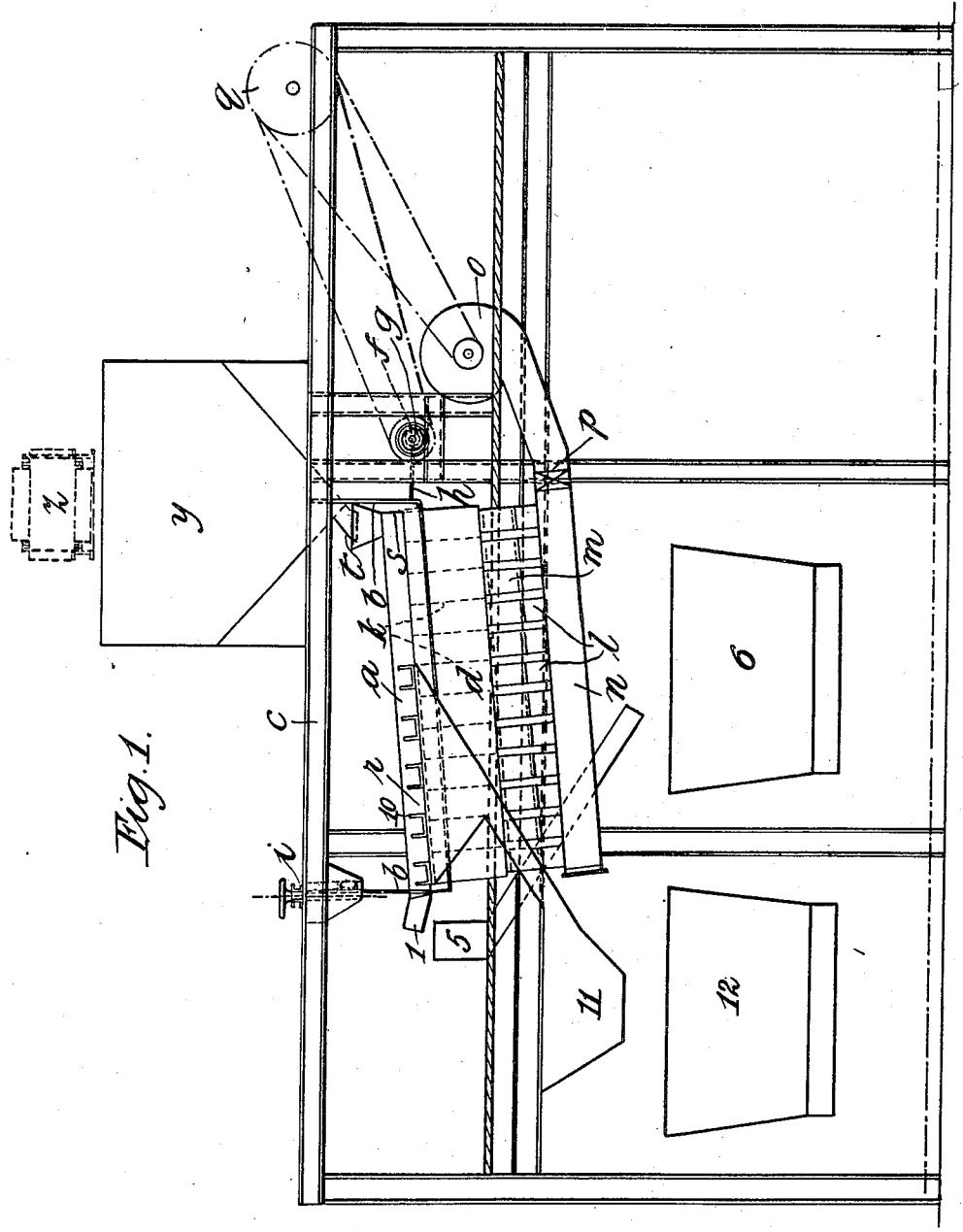

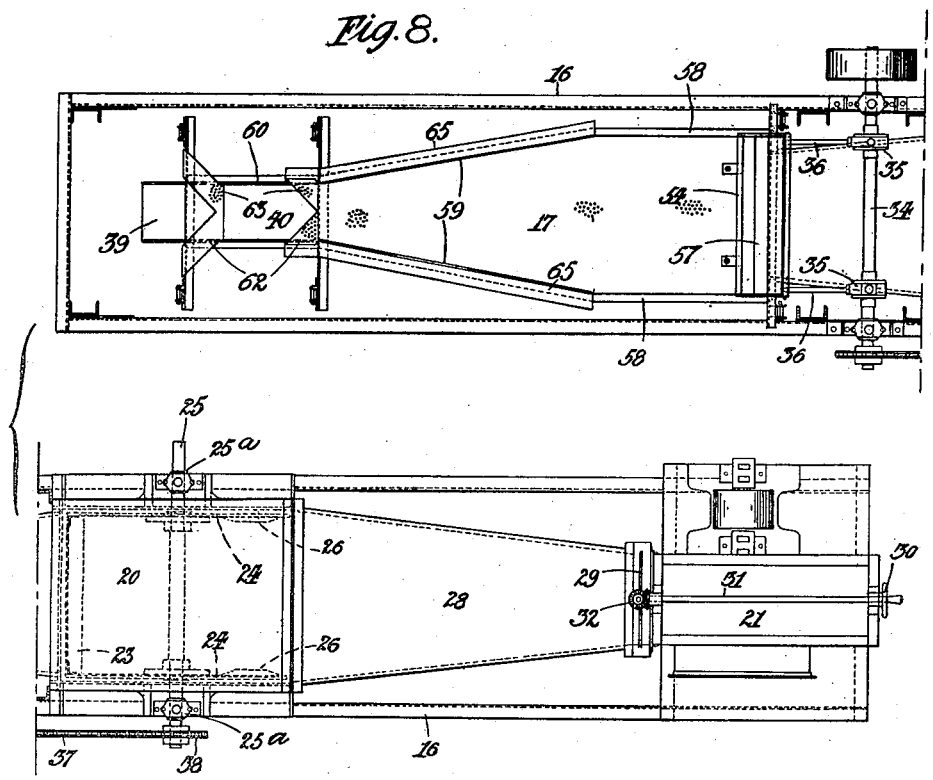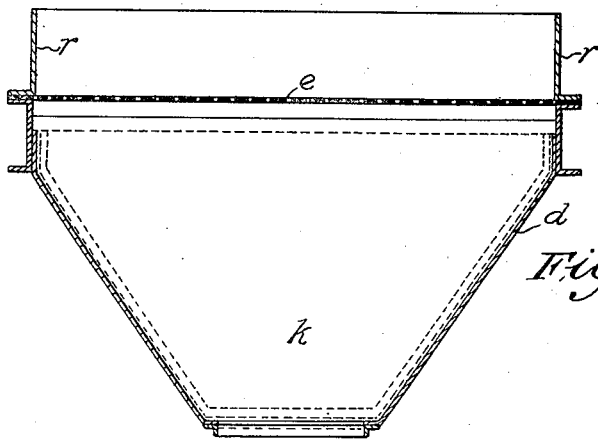

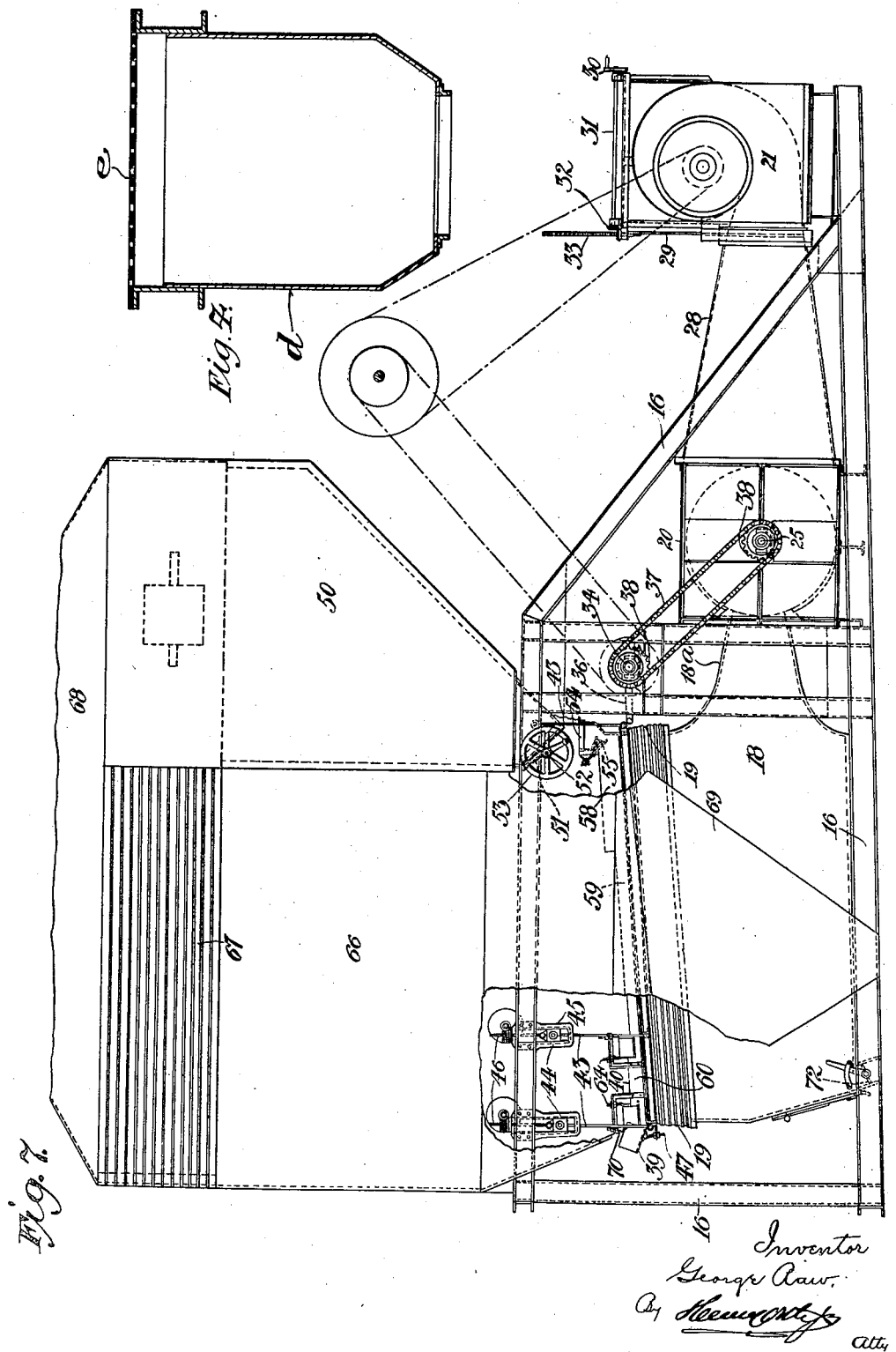

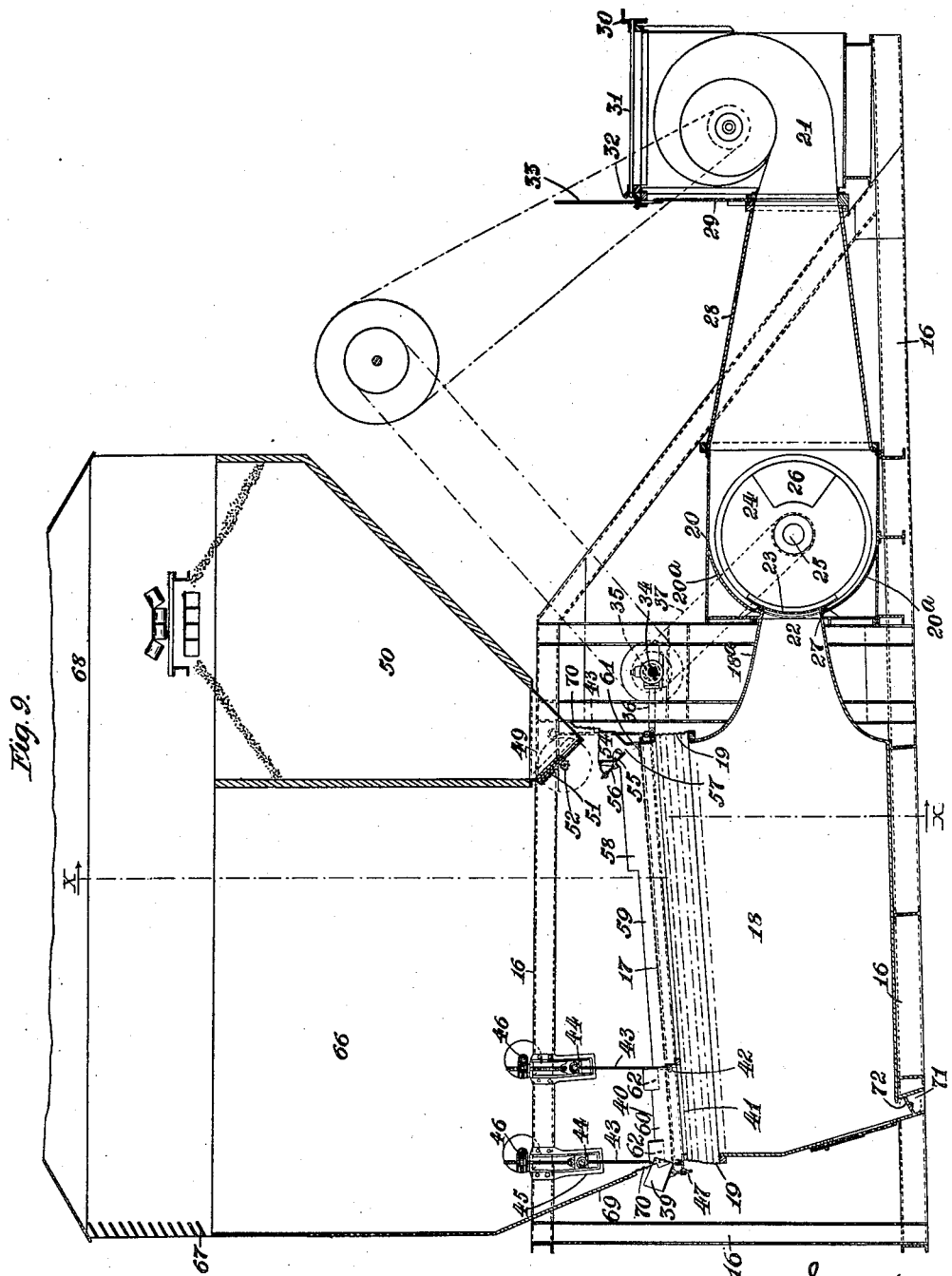

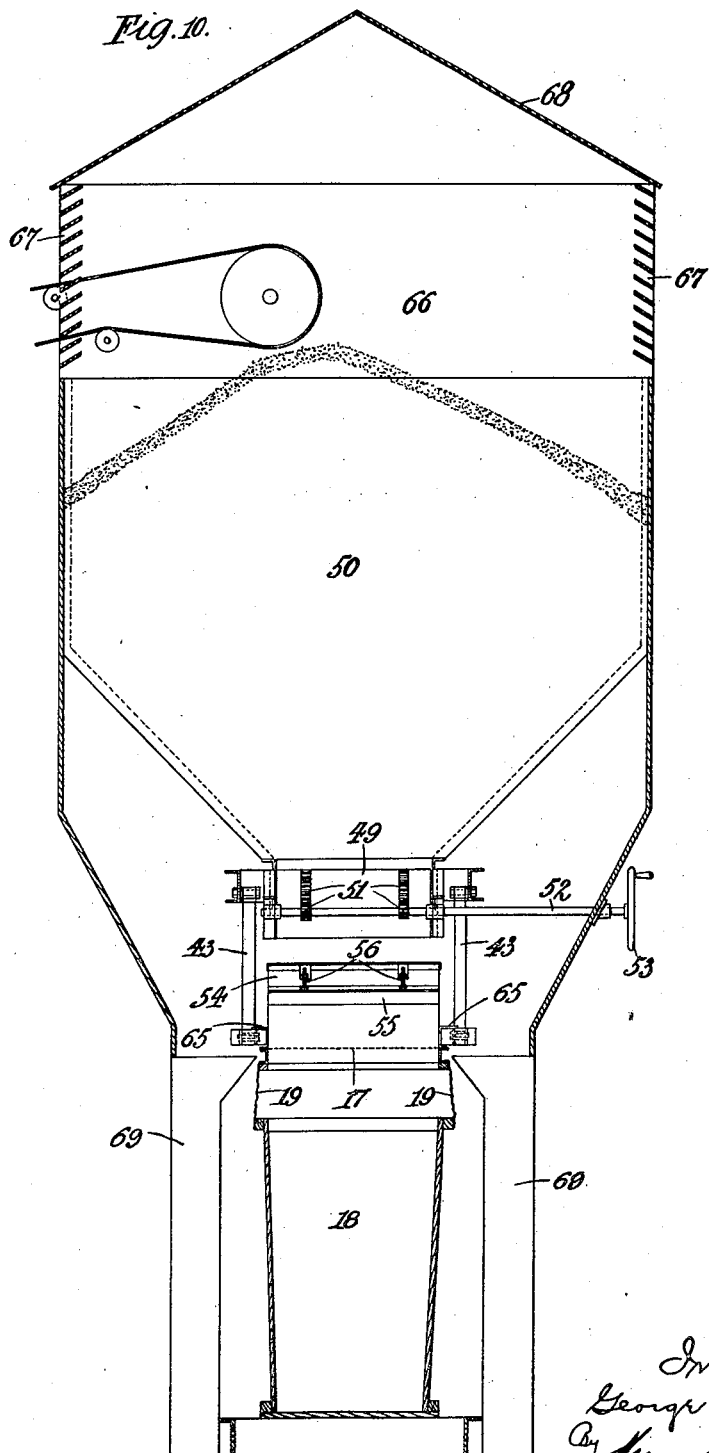

Feb. 2, 1932. G. RAW 1,843,405
SEPARATION OF SOLID MATERIALS OF DIFFERENT SPECIFIC GRAVITIES
Filed April 25, 1927 11 Sheets-Sheet 7
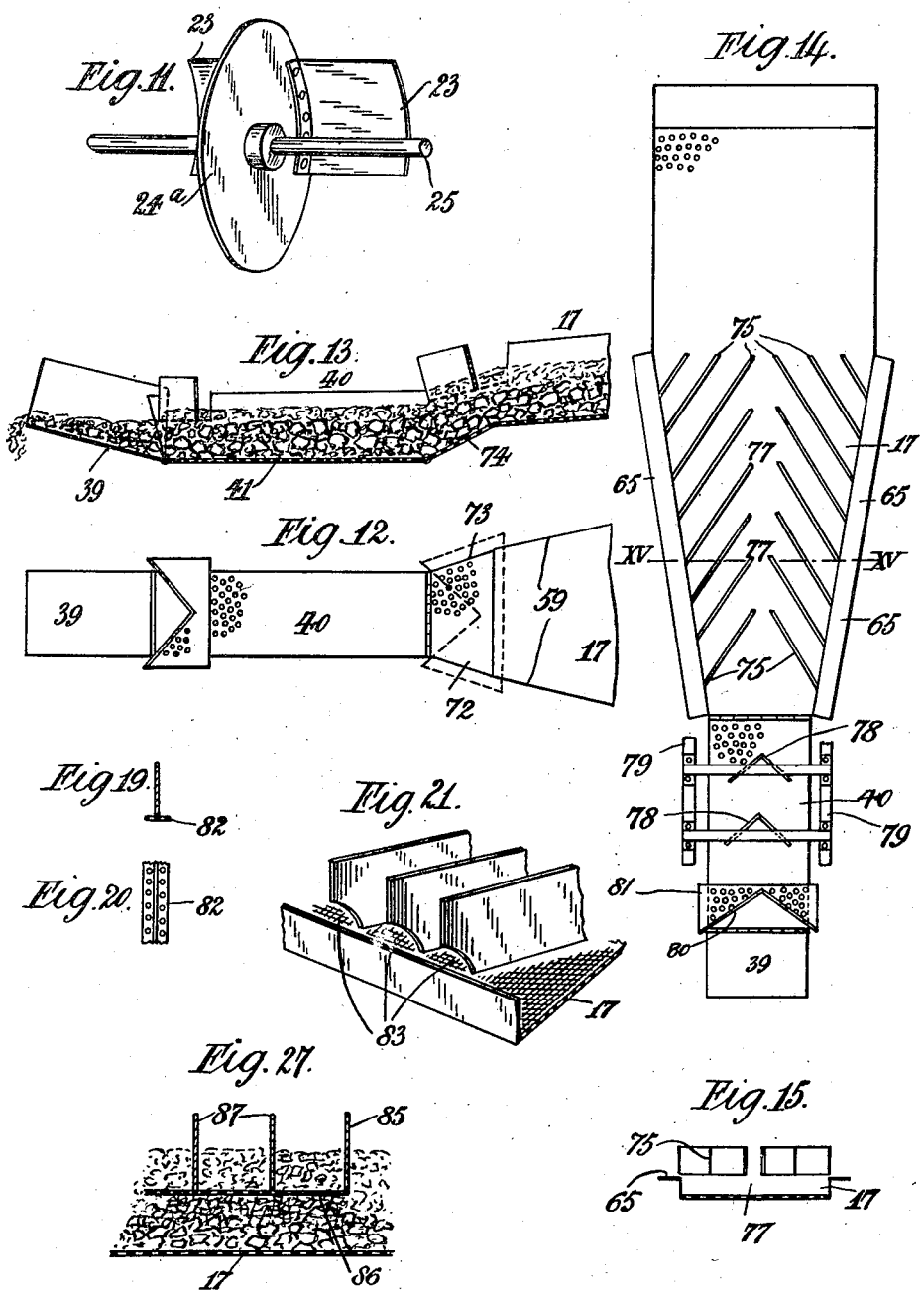

Feb. 2, 1932.  G. RAW  1,843,405
SEPARATION OF SOLID MATERIALS OF DIFFERENT SPECIFIC GRAVITIES
Filed April 25, 1927  11 Sheets-Sheet 8
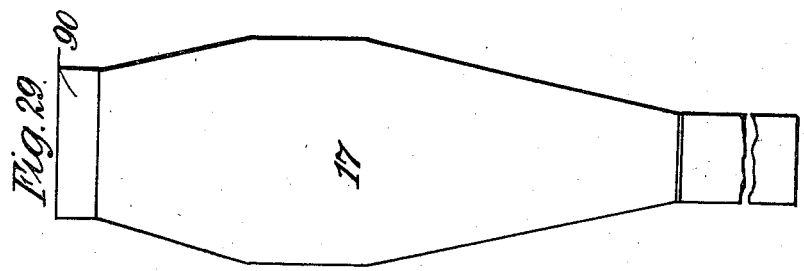
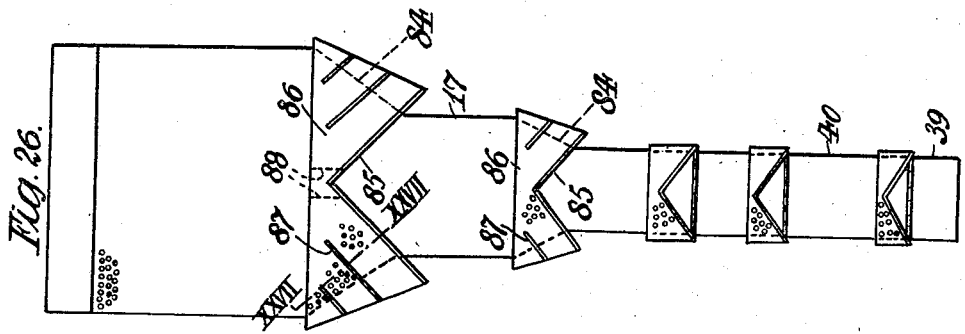
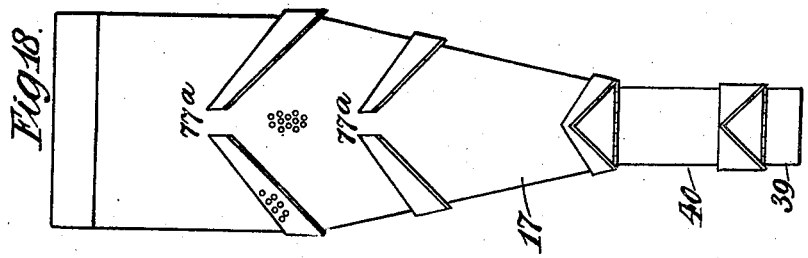
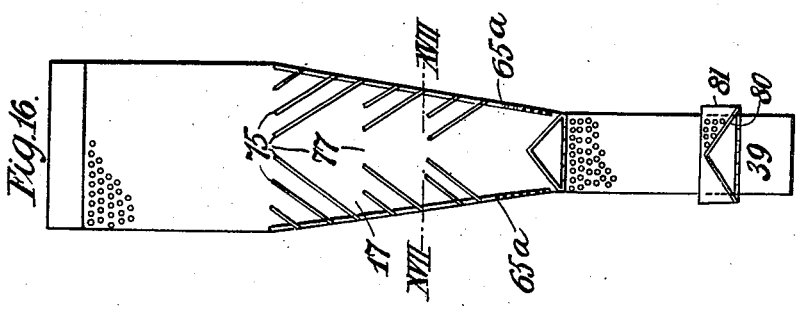
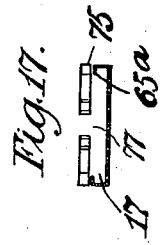
Inventor
George Raw
By
Atty.

Feb. 2, 1932. G. RAW 1,843,405
SEPARATION OF SOLID MATERIALS OF DIFFERENT SPECIFIC GRAVITIES
Filed April 25, 1927 11 Sheets-Sheet 9
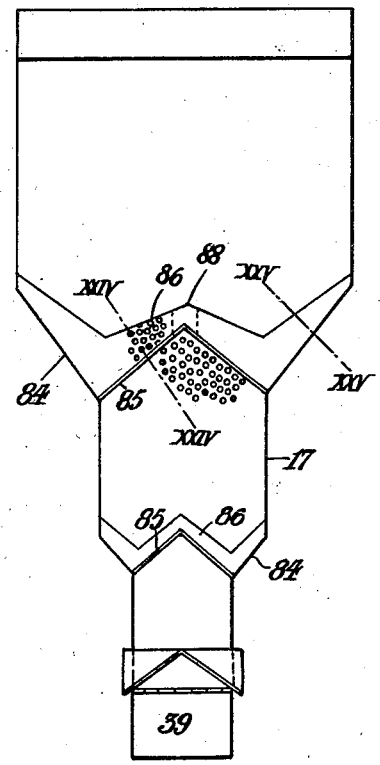
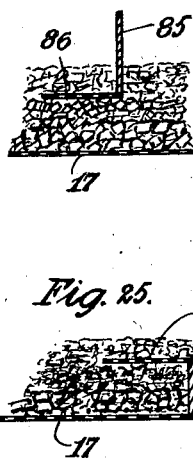
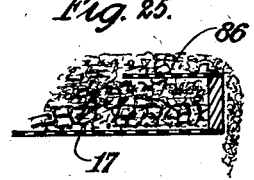
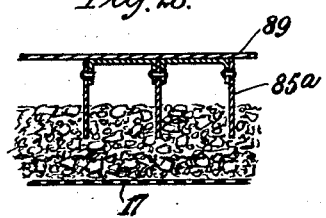
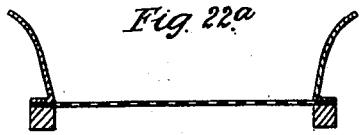
Inventor
George Raw,
By [signature] Atty

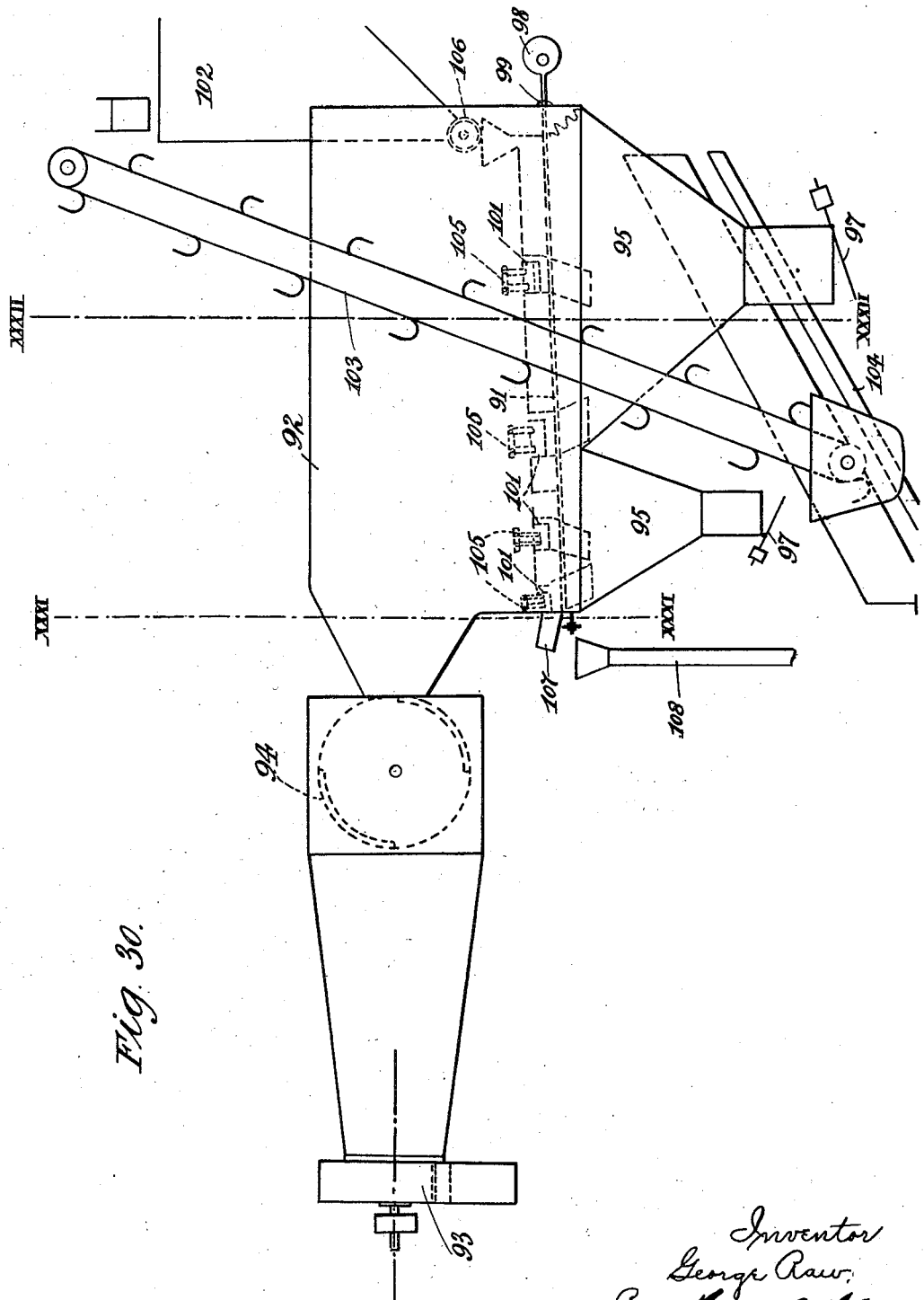

Feb. 2, 1932. G. RAW 1,843,405
SEPARATION OF SOLID MATERIALS OF DIFFERENT SPECIFIC GRAVITIES
Filed April 25, 1927 11 Sheets-Sheet 11

Inventor
George Raw
By
Atty.

Patented Feb. 2, 1932

1,843,405

UNITED STATES PATENT OFFICE

GEORGE RAW, OF NEW WASHINGTON, ENGLAND

SEPARATION OF SOLID MATERIALS OF DIFFERENT SPECIFIC GRAVITIES

Application filed April 25, 1927, Serial No. 186,474, and in Great Britain April 30, 1926.

This invention comprises improvements in and relating to the separation of solid materials of different specific gravities, and is concerned with the process of separation by stratification in which a bed of the materials is subjected to the action of air or other gaseous fluid upon a pervious table or support so as to cause material of relatively low specific gravity to stratify above material of higher specific gravity.

The stratification process is of advantage where the dry separation of materials is preferable, such as the dry separation of ores from their gangue or the dry cleaning of coal, and it is with the latter that these improvements are principally concerned.

Such process is also of advantage where material is cleaned or separated without previous close grading according to size, as all particles below about 2½" or 2" may be treated at one operation.

According to this invention, the separation of materials of different specific gravities and particularly the separation of stone and inferior coal from the good coal, is carried out under determined conditions of pneumatic pressure and thickness of bed of materials upon a pervious table or support, the conditions of operation being such that the materials to be separated are fed along the table in unidirectional manner in a bed of substantially even thickness and possessing such a degree of resistance as to induce a state of fluidity or levitation such that the bed becomes distended or attenuated so allowing the particles of greater density to sink through the mass and displace those of less density, so that the components of the mass lie one above another in strata in order of their density, without liability of intermixing and with avoidance of evacuating or blowing out of the lighter material. The air should not issue through the bed in a blast but on the contrary it is found in practice that the pressure should be such that if the hand were held over the bed, just a gentle movement only of the air would be perceptible, insufficient to blow away any of the material except the dust.

Experiments have shown that the favourable separating action obtained is due to the fact that the suspension and stratification of the bed of materials is by static thrust, using the air or other fluid compressively, as distinct from suspension by dynamic thrust in which the upward movement of particles of lesser density in order to stratify, is due to using the air incompressively and relying upon its kinetic energy to effect separation and stratification. In the latter case, it is necessary that certain limiting relationships between the densities and linear dimensions of the particles to be separated must exist and if these limits are exceeded the separation ceases or is inefficient. In the former case the separation is according to density alone and is independent of the size of the particles. When using kinetic energy as the differentiating influence the magnitude of the thrust must be of such a value that the less heavy particles are moved or suspended while the heavier particles are unaffected. When using static thrust, the particles are not affected by motion of the air but are supported by the degree of compression of the air. The magnitude of the supporting static pressure must approximate to the weight of the bed of material as closely as possible. This causes air to escape through the bed at a certain velocity dependent upon the resistance imposed by the mass of material. As thrust due to dynamic pressure is detrimental to the densimetric separation effected by my process, this velocity must be kept as near zero as possible. The higher the resistance of the bed for a given pressure (which latter is itself proportional to the weight it has to support and therefore also to the depth), the lower will be the value of the said velocity and the less will be its effect on the separation. In practice, it is found that the resistance of the bed may be made so high that the dynamic pressure due to this velocity may be regarded as a negligible quantity and therefore have no adverse effect on the separation. As mentioned above, the velocity of the escaping air is so small that when the hand is placed over the bed only a gentle draught is felt. This in my process represents the dynamic and unused energy in the air and as this escape of air is very small it will be realized that an extremely high efficiency of pneumatic operation is attained in this process as practically all the energy used is that due to the static compression. The resistance of the bed depends upon its physical and mechanical state. The greater the resistance the nearer can the static pressure be made to approach the weight of the material and hence the greater the distention or attenuation of the bed enabling freer relative motion of its elements. This renders the process particularly suitable for the cleaning of small coal and "fines".

It will be clear then that in order that the bed may not be too open, there must be a sufficient quantity of smaller particles present to give close bedding, but they need not all be small as the smaller ones will fit in around the larger ones. In practice, a bed of raw coal capable of passing through say a 2½" ring will generally form a resistance high enough to maintain a sufficiently great static pressure without allowing free flow of the air such as would exert thrust able to affect adversely the densimetric separation of the smaller particles to be separated. The thrust due to motion of the escaping air defines the limit of the smallest particles which will come under the densimetric separating influence, as such particles whose volumes and weights are so small that they are affected by this dynamic thrust would come under the conditions of dynamic pressure separation and would tend to rise in the bed and the finest would be flung out.

It will also be clear that the depth of the bed should be such that the upper surface is even, otherwise the weight would not be the same over all points in relation to the air pressure. Consequently, the bed should be of such a thickness, relative to the size of the larger pieces present, as will give this even weight and the construction and operation of the table should be such as to preserve these conditions. There must be no weak spots to allow "piping" and no evacuation of small material (except dust) by dynamic action from the bed. If air were allowed to escape anywhere due to a change of resistance of the pneumatic system, the pressure would fall and the fluid state would break down. Also, a state of statical equilibrium due to the supporting pressure should be maintained in the material constantly over the whole apparatus until the material is actually and completely separated, that is until the denser material is in the discharge chute and the material of lesser density has travelled to delivery.

It is to be noted that the particles of lesser density to be separated, are not, according to my process, borne upwardly and separated by the dynamic action of air current moving upwardly through the bed. The stratifying action is due to the "fluid" state induced in the material by the static pressure of the air. The static pressure operates in all directions and not merely upwardly through the bed and it separates the particles from each other so that the particles of greater density fall in the bed and displace the particles of less density whereby the latter move to their proper strata solely due to the downward displacement of the denser material.

The operation is the same whether the air or other gaseous fluid is applied under constant pressure conditions or under pulsating pressure conditions. It is to be noted that a further advantage is gained by the use of pulsating pressure of air below the bed. The pulsating air pressure is made to fluctuate with sufficient rapidity between a high and a small value, having a suitable mean similar to that of the former steady pressure. The pulsating pressure is more effective in producing a higher order of "fluidity" and therefore more perfect stratification and obviates risk of piping. The explanation is that the frequent rise and fall of pressure allows of an effective supporting pressure more closely approximating to the weight of the bed, while the fact that it is not constantly at the high value prevents the production of free air currents between the particles and the consequent break down of the necessary statical condition.

The pressure in the bed varies from whatever pressure there is below to the pressure above in direct proportion to the distance through the bed. This relationship may not hold for relatively high pressures, but for the range of pressures through which the apparatus is operated it is found to be sufficiently closely followed.

Assume now, that the depth of the bed be $h$ and the density of the particles of the denser material be $\Delta$ and the density of those of less dense material $\delta$. The pressure beneath a particle equals $$\left(\frac{h-l}{h}\right)x$$

where $l$ is the distance from the bottom of the bed to the underside of the particle and $x$ is the total pressure below the bed. The pressure above the particle, that is, on its upper surface (since static pressure acts in all directions in the bed), is equal to $$\left(\frac{h-l-d}{h}\right)x$$

where $d$ is the vertical dimension of the particle.

The net upward pressure acting on the particle is the difference between that above and that below it. This equals $$\left(\frac{h-l}{h}\right)x - \left(\frac{h-l-d}{h}\right)x = \frac{d}{h}x$$

The total upward force on the particle is $$\frac{d}{h}xXA$$

where A is the cross-sectional area of the particle in a horizontal plane. The weight of the particle, which is the downward force, equals $dA\Delta$ (for a particle of the denser material) and $dA\delta$ (for a particle of the less dense material).

Therefore, for suspension of the less dense material, when these forces balance, $dA\delta$ equals $$\frac{dAx}{h}$$

that is $$\delta = \frac{x}{h}$$

and for the denser material $dA\Delta$ must be greater than $$\frac{dAx}{h}$$

(since $\Delta$ is greater than $\delta$). Thus displacement of the less dense material must take place because $x$ is made practically equal to $\delta n$. This shows that any particle whose density is greater than $\delta$ must sink in a bed under the above specified conditions without relation to its lineal dimensions.

It will be clear from the foregoing exposition of an application of the well-known physical laws of displacement that there may be more than two kinds of material present in the bed or mass and separation of the less dense material by displacement will still take place. Further, that within the limits of practical operation the mass or bed may be of considerable depth as long as the resistance is high enough to allow of an adequate difference in head of static pressure above and below the mass without being so high as to render said laws inoperative and without causing a head of dynamic pressure great enough to cause directional effect or motion of any of the elements concerned in the separation. It is thus not essential that the mass or bed consist only of the raw materials to be separated. It may be desired to introduce an additional material or a quantity of one of the materials to be separated in a different state of division, such as fine coal, in order to adjust the resistance, or it may be desirable to operate the process with a material, such as fine coal, which will form an intermediate stratum to facilitate the mechanical separation of stratified materials; such material need not necessarily take part in the continuous operation of feeding and discharging. In such cases the operating principle remains precisely the same and it is desired to cover such variations of the process in this specification.

The improvements are applicable whether the table be vibratory or stationary provided that the conditions produced allow of free relative motion of the elements of the bed with respect to the forces acting. Vibration of the table aids in breaking down the friction between the particles and in the case of the stationary bed this friction may be overcome by appropriate use of pulsating air pressure. With vibratory tables either continuously applied or pulsating pressure may be used.

Advantages of using pulsating pressure are that more efficient use can be made of the pneumatic energy, as a greater degree of levitation and fluidity can be obtained with a given quantity of air, than if the pressure were continuously applied. In consequence of this, it is possible to attain such a high degree of distension and attenuation of the whole bed of material, that each individual particle is surrounded by a more pronounced air cushion and is at a greater distance from its nearest neighbour than when the current is continuously applied resulting in the bed occupying a much greater volume. The minimum of obstruction to motion is thus offered to each particle, allowing the denser ones easily to sink or displace the others, this degree of sensitiveness being also conveyed to the finest particles to be separated, without risk of their evacuation by escaping air. The required effect is obtained by correctly relating the frequency of pulsations, the pressure producing the air flow, and the relation of the time the air supply port is open to the time it is shut, during each cycle of pulsation. These conditions will be varied to suit different materials being treated and materials in different physical states, according to the circumstances, but generally it may be stated that the pressure must be applied under such conditions that the whole thickness of the bed of material is subjected to the action of the air or other gaseous fluid and all particles of the material are kept constantly in the aforesaid state of attenuation and fluidity without so-called piping or violent blowing of the air through the bed, that it, dynamic action, which would cause the lighter particles to be carried away.

An important consideration is that the pulsations should be sharply defined to cause sharp rise and fall of the pressure beneath and in the bed of materials, and a suitable construction of pulsator enabling fulfilment of these conditions will be hereinafter described.

A further feature of the invention consists of providing, in vibratory tables, for synchronism between the operation of the pulsator supplying the air or fluid pressure and vibrating mechanism used for imparting longitudinal impulses to the pervious table or deck, for the purpose of facilitating or controlling the propulsion of the material along the table.

Apparatus for carrying out the process suitably comprises a horizontal or inclined table or deck with a pervious bottom to allow freedom of action of the air on the bed, and upstanding sides enabling maintenance of the thickness of the attenuated bed of materials so that the desired resistance may be preserved. The table is constructed to provide stratifying and separating regions merging one into the other, and the sides may converge towards the lower or forward end of the separating area, or other means are provided to maintain the thickness of the bed. The table may terminate in a horizontally pivoted discharge chute adapted by vertical adjustment to allow uniform or constant discharge of the denser material at any desired rate.

The materials to be separated are fed on to the table from a feed hopper extending the whole width of the rear end of the table and skimmers or scrapers may be provided at definite points on, or intervals along, the bed for skimming off or assisting to discharge the upper layer or layers of separated material. The feed box or hopper may be adapted by vertical adjustment of its discharge to maintain a desired thickness of the bed and by horizontal adjustment to maintain a rate of feed of materials to preserve this thickness of the bed at any desired degree of inclination of the table.

The apparatus may also comprise a trough or cell arranged intermediately between the separating or discharge zone of the table and the discharge chute for concentrating the denser material thus enabling a fluctuating load of stone to be dealt with and middlings to be finally separated, and a dust chamber may be provided for arresting and collecting dust rising from the table.

The air pressure may be applied to the bed of materials through an air box arranged below the pervious support or, as an alternative, provision may be made for producing the required difference of pressure, above and below the bed by exhausting the air or other gaseous fluid.

In order to enable the invention to be readily understood, reference is directed to the accompanying drawings, in which:

Figure 1 is a diagrammatic general view of a coal separator plant embodying one form of separating apparatus in accordance with this invention.

Figure 2 is a vertical longitudinal section to a larger scale of the separator seen in Figure 1.

Figure 3 is a plan of the separator seen in Figure 2.

Figures 4 and 5 are cross-sections on the lines IV—IV and V—V respectively of Figure 2, and Figure 6 is a cross-section of a skimmer or scraper seen in Figure 3, the line of the section being shown at VI—VI.

Figure 7 is a side elevation of another form of separator in accordance with the invention, parts being broken away for the sake of clearness.

Figure 8 is a sectional plan of the separator shown in Figure 7.

Figure 9 is a central longitudinal section of the separator seen in Figures 7 and 8, and Figure 10 is a cross-section on the line X—X of Figure 9.

Figure 11 is a perspective view of a modified form of pulsator device.

Figure 12 is a diagrammatic plan illustrating a modified form of stone cell.

Figure 13 is a central longitudinal section of part of the table or deck with step entry to the stone cell.

Figures 14, 16 and 18 are diagrammatic plan views of separating tables with modified arrangements of scrapers.

Figure 15 is a cross section on the line XV—XV of Figure 14.

Figure 17 is a cross-section on the line XVII—XVII of Figure 16.

Figure 19 is a cross section of a modified form of scraper for the separating tables.

Figure 20 is a part plan of the scraper illustrated in Figure 19.

Figure 21 is a perspective view illustrating a further form of scraper.

Figures 22 and 22ª are cross-sections showing modified forms of the side walls of the separating area.

Figure 23 is a diagrammatic plan view of a modified separating table.

Figures 24 and 25 are cross-sections to a larger scale on the lines XXIV—XXIV and XXV—XXV of Figure 23.

Figure 26 is a diagrammatic plan of another form of separating table.

Figure 27 is a cross-section to a larger scale on the line XXVII—XXVII of Figure 26.

Figure 28 is a sectional view of a modified form of scraper device for use with the table shown in Figure 26, the section corresponding to that of Figure 27.

Figure 29 is a diagrammatic plan view of a further form of separating table.

Figure 30 is a diagrammatic side elevation of a plant in which the required difference in static pressure above and below the bed of materials is set up by exhaust means.

Figure 31:
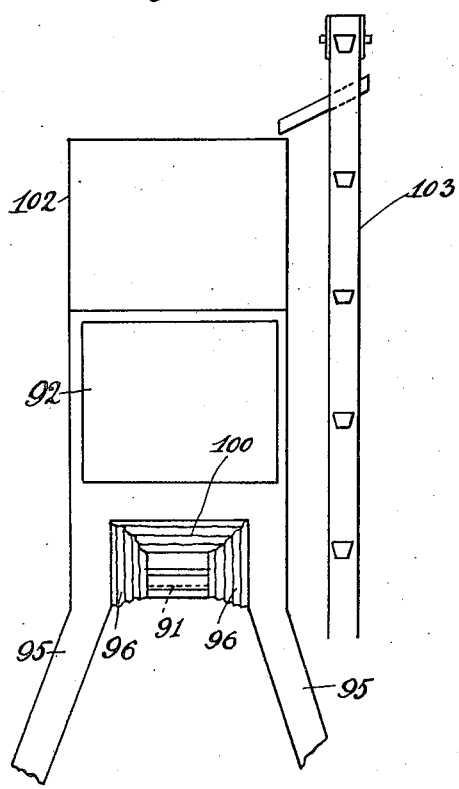

Figure 31 is a cross-section on the line XXXI—XXXI of Figure 30, and

Figure 32:
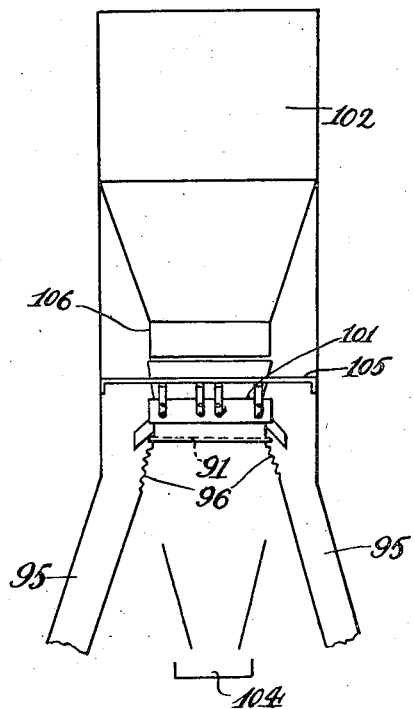

Figure 32 is a similar section on the line XXXII—XXXII of Figure 30.

In Figure 1, the separator unit $a$, seen separately in Figures 2 to 5, is shown suspended by spring steel hangers $b$ from the upper part of the framing $c$ of the installation. The separator comprises an air box $d$ with sides partly vertical and partly converging as seen in Figures 2, 4 and 5, and with an open top which is covered over with perforated plate, wire gauze or other air pervious medium of suitable gauge to serve as a pervious table or support $e$ for the materials to be separated. The blade spring supports $b$ constitute a convenient means whereby the table may be mounted or hung to allow of vibratory or jigging motion, which is suitably imparted by an eccentric or eccentrics $f$ on a shaft $g$, but any other suitable or known form of supporting and jigging mechanism may be used. The eccentric or eccentrics $f$, here employed, are shown connected by connecting rod or rods $h$ to the rear end of the upper part of the framework of the air box $d$ and the inclination of the table may be varied by screw and nut mechanism $i$ applied to the front hangers $b$ of the table.

The interior of the air box may be divided into compartments by a series of transverse partitions $k$ (Figures 1 and 2) and leading into the side or, as shown, the bottom of the air box is a number of air supply pipes $l$ each of which comprises a flexible portion $m$ for allowing of vibratory motion of the box with the pervious table or deck $e$. The pipes $l$ branch from a supply main $n$ connected with a fan or equivalent device $o$ through a flexible portion $p$. In this manner any desired quantity of air may be admitted to the air box or the compartments thereof and distributed below the air pervious table. The fan $o$ and eccentric shaft $g$ may be driven from a pulley $q$ as shown in Figure 1 or from a motor or other source of power.

The pervious table or deck is provided with upstanding sides $r$ and rear wall $s$ mounted on the air box $d$. As seen in Figure 3 the two side members $r$ extend parallel to each other for a certain distance from the rear wall $s$. The length of these parallel side parts bears direct relation to the time of stratification of the material or of the top layer of material fed on to the bed and the area enclosed by them and the rear wall may be termed the stratification area. From the end of this area the upstanding sides are continued to the forward edge of the table or support, converging towards each other, and this part of the table is called the separation area of the table.

At the rear end of the table or deck $e$ and mounted on the upstanding sides as shown in Figure 2 is a feed box or hopper $t$ extending the width of the air box. The front and rear walls converge downwards and leave a rectangular opening $u$ (Figure 3) at the bottom. This opening is adjustable for vertical position and horizontal opening as by a sliding plate $v$ with adjusting screw mechanism $w$ on the front wall and by hinging the latter at the upper end at $x$. This feed box is itself fed from a large stationary supply hopper $y$ (Figure 1) which is kept supplied by suitable conveyor mechanism the head of which is shown in dotted lines at $z$ in Figure 1.

At the forward edge of the air box $d$ a chute 1 of the same width as the adjacent end of the table or deck $e$ is mounted on a horizontal hinge 2. This chute has upstanding sides 3 and the inclination of the chute may be varied to regulate the speed or flow of the stone discharge as by screw and nut adjusting mechanism 4 seen in Figure 2. The stone discharges into a chute such as 5 which may direct the stone into a truck 6 as shown diagrammatically in Figure 1.

Across the table or deck at its extreme forward end and immediately before the stone chute 1 there may be mounted a scraper or skimmer 7 for removing separated material from the top of the bed. This skimmer is suitably of V shape in plan and may consist simply of a vertical plate or plates or the plate or plates may be fitted with a foot 8 of perforated metal plate or gauze so as to be of L form in section such as is shown in Figure 6. It will be seen from Figure 3 that the perforated foot 8 of the skimmer expands towards its discharge ends and that the skimmer extends slightly beyond the upstanding sides $r$. It suitably passes through gaps 9 in such sides which may be fitted with discharge spouts 10 Figure 3, for delivering coal removed by the scraper into chutes such as 11 and thence to a truck 12 as shown diagrammatically in Figure 1.

Similar scrapers or skimmers 13 may be mounted at any desired position along the pervious table or deck for removing any predetermined portion or layer of the material, and preferably one is arranged just at the end of the stratification area and one or more between that one and the scraper 7 at the extreme forward end of the table. There may, if desired, be two or more scrapers placed close together at the forward end of the table just before the stone chute 1. The scrapers may be suitably suspended in a framing 14 carried by the air box $d$. The form of suspension shown is screw and nut gear 15 which allows the scrapers to be vertically adjusted to suit requirements.

The function of the skimmer or skimmers is to remove or separate material of lesser density from above material of greater density. The latter passes under the skimmers or scrapers, while the former passes along or is deflected by the skimmers and discharges at the side of the table or deck into the chutes 11 aforesaid or it may be on to travelling belts or otherwise.

In operation, the materials to be separated pass from the stationary supply hopper $y$ into the feed box or hopper $t$ which is fixed with respect to the table and reciprocatable with it, and from thence the materials fall by gravity on to the pervious table or support $e$ which is being reciprocated by the eccentric or eccentrics $f$.

The feed is across the whole width of the rear end of the table and the rate of feed is made such that a bed of materials is formed of which the depth is sufficiently greater than the size of the largest pieces, as to enable the bed to have an even upper surface, and is such as to provide the desired resistance to the air pressure supplied to the air box $d$ beneath the pervious support by the fan $o$. Stratification of the materials commences as soon as they fall on to the table from the hopper $t$ due to the static pressure of the air combined with the vibrating or jigging action of the table or deck $e$ and this action continues as the materials flow towards the converging side parts of the table, the particles of greater density sinking on to the pervious support and displacing those of lesser density which are thus raised in the bed and stratified above the denser material. The height of the sides of the stratification area is such that overflow of the materials is prevented in that region but the sides of the separation area are made of less height or gaped, as at 9, so that material of lesser density may overflow the sides or discharge through the gaps. When skimmers are employed, as shown, the top layer of less dense material or materials progresses on to the horizontal limbs or feet thereof and is then deflected by the vertical part of the skimmers and readily slips along the foot portions thereof and past the sides of the table through the gaps 9 where it falls from the spouts 10 into the chutes 11 or on to the travelling belt or belts aforesaid.

At the first or rearmost scraper, a mechanical separation and discharge of part of the less dense material is effected and as the remaining materials pass under the scraper they become subjected to the influence of the converging sides of the table so that the thickness of the bed is built up again. The material then comes into contact with succeeding scrapers until the one 7 is reached, the converging sides of the table exerting the same influence as aforesaid. The last remnant of the less dense material is removed by the scraper 7 and the denser material urged by the vibratory motion and the weight of material behind it piles up in the stone chute 1. This is arranged at such an inclination, as shown in Figure 2 by way of example, that only the desired rate of discharge takes place from its forward end.

By suitable adjustment of the inclination of the chute 1 and the vertical position of the final skimmer or skimmers any desired product can be obtained from the stone chute and last scrapers. For example, all the stone can be discharged from the stone chute and all the remaining coal, inferior coal and middlings from the last scraper or scrapers.

The apparatus described is very efficacious for cleaning coal by dry separation, avoiding the disadvantages of wet processes and, moreover, it is capable of dealing with a large range of sizes in one separating operation.

The construction of apparatus shown in Figures 7 to 10, is adapted for operation under pulsating conditions of the air pressure. It comprises a suitable framing or chassis 16 for the mounting of the various parts and as before the pervious table or deck 17 is of rectangular shape for the first part of its length, followed by a forwardly converging part. The table in this case, however, is separate from the air box 18 and is connected therewith by a canvas or other flexible portion 19 which permits vibratory motion of the table while the air box remains stationary.

At the rear end, the air box 18 communicates with the casing 20 of a pulsator, which in turn is connected with the casing of a centrifugal fan 21 or other suitable means for providing the required air pressure. The pulsator may be of any suitable form as for example, a rotating vane or shutter, or two or more vanes, adapted to move past the passage or port 22 between the air box and the pulsator casing 20. It is convenient to use a curved vane 23 mounted between a pair of discs or spiders 24, Figures 8 and 9, carried by a shaft 25 arranged centrally in the pulsator casing and running in suitable bearings $25^a$. As an alternative, the vane may be mounted or constructed on a single disc or spider $24^a$ as will be evident from Figure 11, projecting preferably to either side thereof as shown in that figure. The vane is carried at the periphery of the disc or discs $24^a$ or 24 and its curvature conforms to such periphery. The weight of the vane may be counterbalanced if desired as by weights 26 attached to the discs 24 in Figures 8 and 9, and it will be seen that as the shaft 25 is rotated the segmental vane 23 will periodically pass the port or opening leading to the air box. A sealing strip 27 may be provided around the air port 22 and if desired the pulsator casing may be made wider transversely, than shown in the drawings, to allow increased passage of air to the air box. By suitably dimensioning the diameter of the pulsator vane rotor or discs and the circumferential length of the vane or vanes, the air may be arrested and released in such a manner and with such periodicity as will give the required range of pressures in the air box 18 below a bed of materials on the table or deck 17. This form of pulsator is capable of giving sharply defined cut-in and cut-off of the air current so that sharply defined pulsations are obtained. The pulsations may be made more pronounced by providing oppositely coned or contracted formations of the adjacent parts of the air box and pulsator casing as for example by constructing the rear part 18ᵃ of the air box as shown in the drawings and inserting curved portions 20ᵃ in the pulsator casing. Such construction will give a Venturi form of duct with its smallest dimension at the air port 22 between the air box and the pulsator, so that cut-in and cut-off of the air may take place at a region where the velocity of the air stream may be at its maximum. The pulsator casing is suitably connected with the fan casing by a flaring part 28 and a damper may be arranged at a suitable point in the air circuit to control the air supply. A suitable damper is shown at 29 and is operated from a hand wheel 30 through a shaft 31, bevel gears 32 and screwed spindle 33.

The passage of the material along the pervious table or deck 17 may be controlled by synchronizing the speed of the pulsator shaft 25 with that of the shaft 34 of the eccentrics 35 for vibrating the table. The latter is connected to the eccentrics through connecting rods 36, and the two shafts may be connected by chain 37 and sprockets 38 of 1—1 ratio.

The relative positions of the eccentrics and pulsator vane 23 may be timed so that the port 22 is closed during the forward stroke of the table, or during the backward stroke, or at either end of the stroke. In this way, the materials being separated may be in contact or closer contact with the pervious support on the forward or backward movement of the table, or only at the end of such movements, and raised clear of the support at other times by the air impulses resulting in only the forward motion or only the backward motion, or neither as the case may be, taking directional effects on the materials. The particular timing adopted may be varied according to the nature of the materials being treated, and depends to some extent on the particular inclination adopted for the table. Motion may be imparted to the shafts 34 and 25 as well as to the fan 21 in any suitable manner and suitable overhead driving gear is seen in Figures 7 and 9.

The table 17 as before, comprises a stratification area, a separating or discharge area, and an adjustable stone trap or chute 39, but in this construction an intermediate trough portion 40, which may be termed a "stone" cell, is advantageously fitted between the stone chute 39 and the separating area for enabling a fluctuating load of denser material to be dealt with and for separating "middlings" or particles of intermediate density from the stone. This trough portion or stone cell 40 which is suitably of rectangular form in plan, has an air pervious bottom 41 open to the air box 18, and it is hingedly connected as at 42, to the forward end of the separating part of the table 17, so that it may have any desired inclination with respect to the table proper 17.

The table 17 and stone-cell 40 may be suspended in the framing 16 by spring steel hangers 43 or other suitable devices (Figures 7, 9 and 10) and those forwardly of the table and stone cell may be connected with sliding blocks 44 adjustable as to elevation in guides 45 on the framing 16 by the hand wheel and screw mechanism indicated generally at 46. The table 17, stone-cell 40 and stone trap or chute 39 may be adjusted to any desired inclination and the adjustment shown in Figures 7 and 9 is not intended to suit all working conditions. The stone chute 39, as shown, is hinged to the forward end of the stone cell and is adjustable as to inclination by suitable means such as the screw gear 47.

As before, the table 17 is fed with materials from a feed box or hopper supplied from a main hopper above. In the form of feed shown in Figures 7, 9 and 10, however, the front and rear walls of each hopper comprise downwardly converging lower portions. There is an adjustable slide 49 on the front wall portion of the main hopper 50 which may suitably be moved by rack and pinion gear 51 operated by shaft 52 and handwheel 53. On the feed hopper 54 the converging part of the front wall comprises a slide 55 which may be adjusted by screw mechanism 56 to enable the opening to be suitably controlled for proper portioning of the feed opening 57 in the bed of materials on the table. The converging lower part of the front wall of the feed hopper 54 may also be hinged at its upper end as in the previous construction. Obviously, other suitable or known means of supplying a steady even flow of materials on to the pervious table may be employed with this or any other construction of table in accordance with my invention, such as a shovel feed, revolving drum type of feed or conveyer belt feed. The main hopper 50, in Figures 9 and 10, is shown associated with a belt conveyor for supplying it with material.

The upstanding sides 58 of the stratification area of the table 17 are suitably of greater height than the sides 59 of the separating area of the table, as seen in Figures 7 and 9, to prevent overflow of material before it has properly stratified. The stone cell also has upstanding sides 60 which are higher than those of the separating area, thus confining middlings so that they may be effectively dealt with.

In order to obviate risk of piping of the air immediately beneath the feed hopper 54, a non-pervious plate 61 of short forward length may be placed immediately below or above the pervious deck or table surface directly below the feed and abutting the rear upstanding wall of the table as shown for example in Figure 9.

In order to suit particular conditions some or all of the scrapers or skimmers shown in the first construction of apparatus may be dispensed with so that the discharge of material over the sides of the separating area may be entirely or mostly accomplished by the flow of the bed in its extreme fluid state. There are no scrapers on the separating area of the table shown in Figures 7 to 10 but two are mounted over the stone cell 40 to discharge middlings through gaps 62 in the sides 60 thereof. Both these scrapers or skimmers comprise vertical parts of V form in plan and each has rearwardly extending foot portions 63 of the form shown in Figure 8. They may be adjustable as to height from the pervious deck by the screw gear 64 illustrated in Figure 7. Along the clean coal discharge that is along the top edges of the sides 59 of the separating zone, external horizontal non-pervious lips 65 may be fitted to aid an even overflow of separated material without boiling or piping of the bed at the sides. Other alternatives for the same purpose will be hereinafter described.

For the purpose of collecting dust, which may rise from the table, a dust extraction cover 66 is suitably fitted over the separator comprising upwardly diverging sides and having louvred openings 67 at the top and preferably a gable roof 68. This dust cover may be combined with the main supply hopper 50 as shown in Figures 7, 9 and 10, and both covered by the gable roof 68. The longitudinal sides of this dust cover 66 extend down to the outer sides of chutes 69 arranged on each side of the separator for receiving discharged material and canvas flaps such as 70, connect other parts of the separator to the dust cover to prevent escape of dust and enable same to be recovered. The dust cover is of such height that substantially all the dust rising from the bed is able to settle down and be recovered without passing through the louvred openings 67 which are only intended for the escape of air. The extremely low velocity of the air rising from the bed raises the dust to only a relatively small height so that the dust cover may be of the smallest vertical dimensions possible.

For the removal of "hutchwork", that is material which passes through the perforated bottom of the table and stone cell into the air box 18, an outlet 71 fitted with valve 72 may be provided at the lower forward part of the air box as shown in Figures 7 and 9, or other means may be provided for dealing with this material.

It is believed that the operation of the separator thus described with reference to Figures 7 to 10 will be understood without further description.

In some cases (e. g. when there is an unusually small quantity of the denser material in the bed), it is advantageous to make the stone cell narrower than the forward end of the separating zone of the table. This is illustrated in Figure 12 in which the stone cell 40 is shown connected with the forward end of the separating area of the table 17 by a trough part 72 of which the sides 73 converge more steeply than the sides 59 of the separating zone. One of the scrapers or skimmers for use with this construction may be placed over the trough part 72 as shown by the dotted lines.

The stone cell 40 may also be entered by a downward inclination or step 74 as shown by way of example in Figure 13. The consequent disposition of the pervious floor 41 of the stone cell at a level below that of the main table is advantageous in certain circumstances, for securing the more facile flow of the denser material into the stone cell, as it relieves the lower stratum in the separating zone of back pressure due to the level or upward inclination respectively of the stone cell 40 or stone chute 39. Two scrapers or skimmers are shown in section in Figure 13, one being arranged over the part 74. In some cases, steps similar to the step 74 may be provided at other parts of the table.

Figures 14 to 17 illustrate improved arrangements of skimmers or scrapers which may be adopted for the separating zone and stone cell. In Figures 14 and 15, the separating area is shown with scrapers 75 disposed as a series along the sides whereas in Figures 16 and 17 they are arranged in groups in that area with the forward edges of each group in a straight line as regarded transversely of the table. The skimmers in these constructions may consist of vertical plates or they may comprise vertical plates with perforated feet. It is also to be noted that there is a central gap 77 between scrapers on opposite sides of the separating area in Figures 14 to 17 to allow straight flow through of part of the material to assist in maintaining even depth of the bed over the table.

The stone cell in Figure 14 is shown provided with two (or there may be more) scrapers 78 of plough or V form preferably adjustable vertically, of less width than the cell and arranged at suitable intervals along its length. These may be fixed to a suitable stationary frame 79 not connected with the vibratory table or deck, so as to prevent "end action" or wall effect, which can be observed when anything is moved rapidly in a fluid and tends to produce an uncontrolled escape of air, owing to the "fluid" materials of the bed lagging behind the moving parts, and may be liable to cause mixing of the different materials of the bed. This stationary fixing may be applied to other parts which are immersed in or have engagement with the bed, where conditions require it, and by way of example, all skimmers on the table are shown so fixed in the apparatus illustrated in Figures 30 to 32 as hereinafter described. The stone cell may also, or alternatively be fitted with a V form scraper or scrapers extending beyond the sides of the cell. Such a scraper may be placed over the forward end of the cell just before the stone chute 39 as seen at 80 in Figures 14 and 16. This scraper may comprise a perforated foot part 81 and under the scraper the table may comprise a "dead" area (not shown) to mark off the area where it is desired to merge from "fluid" material to the "dead" material in the stone chute. It does not alter the pressure of the air in any part of the bed where the material is required to be "fluid". The feet 81 may be of the tapering form seen in Figure 3 but preferably they are so wide that the rear edge extends in a straight line transversely across the cell at a point a short distance rearwardly of the point of the V, a form which may also be adopted in some cases for the separating zone of the table or deck.

The middlings may if desired, be separately discharged and, according to one method of practical operation, can be returned to the feed continuously by suitable conveying means as will be hereinafter described with reference to Figures 30 to 32. According to the physical state of this material it may where desirable, be subjected to other treatment, such as crushing, before re-entry in the feed hopper of the apparatus. A quantity of middlings may thus be built up on the stones in the stone cell, so that coal is prevented from discharging with the stone during any temporary fluctuation in the quantity of stone fed on in the raw coal. The degree of purity of coal is also improved, as the middlings of less density are discharged with the coal, while those of greater specific gravity are discharged with the stone as desired.

Figure 18 shows a table with an alternative form of scrapers providing central gaps 77a between the scrapers on opposite sides for the purpose aforesaid. The scrapers may in any construction of table be made vertically adjustable towards and away from the table or stone cell and the perforated feet, when used may be of the narrow form shown at 82 in Figures 19 and 20 to prevent piping or boiling due to disturbance in the bed caused by the scrapers. The scrapers may also be cut away at the lower end corners adjacent the sides of the separating area for the same purpose, as shown for instance at 83 in Figure 21.

In Figures 16 and 17 an alternative form of lip for the sides of the separating area of the table is illustrated. The lip 65 aforesaid (see also in Figures 14 and 15) projects externally from the table. In Figures 16 and 17 a form of lip 65a is shown which protrudes inwardly of the table being made of perforated plate or gauze because they would extend over the bed of materials on the table. Instead of or in addition to the lips, the sides of the table may be inclined slightly outwards as shown in Figure 22 or curved in similar fashion as seen in Figure 22a, to prevent boiling of the bed at the sides.

The height of the converging sides of the separation area may in any of the constructions, be made adjustable to control the condition of the bed.

In modified forms of table, the convergence of the upstanding sides of the separating area may not be constant from the end of the stratification area, but may take place in successive steps, the intervals between the step portions being parallel to each other. This arrangement may be desirable to preserve a required depth of bed and examples are shown in Figures 23 and 26. As illustrated by these figures the steps may be angular as at 84, sloping forwardly, and discharge of separated coal may take place over these angled portions assisted by suitable scrapers such as 85, if desired. The scrapers 85 may be of V form extending across the bed at each angular contraction 84 and they may have rearwardly directed and perforated feet 86 as seen in Figures 23 to 25 and Figures 26 and 27. The feet may be of W shape in plan (Figure 23), the two inner branches of the W extending from the two arms of the V form scraper and the two outer branches extending along the angled parts of the sides of the separating zone, or as shown in Figure 26, the feet 86 may be of a form to present a straight rear edge running transversely across the bed. When so formed the feet may be fitted with partitions 87 spaced from and parallel with the arms of the V form scrapers for evenly distributing the overflowing stream. The scrapers may extend to or slightly over, the angled portions 84 of the sides as shown in Figures 23 and 26 respectively. When they extend over the sides, the extended portions need not be perforated as they do not lie over the bed of materials. The dotted lines at 88 in Figures 23 and 26 represents a central gap which may be provided in connection with any of the scrapers of the separating area of the table as and for the purpose above described. A step or inclination, similar to the step 74 (Figure 13), may be provided in these constructions at the first or at each of the contractions 84 of the table. Figure 28 represents a modified arrangement of scrapers for use with the construction of table shown in Figures 26 and 27, the feet being dispensed with and the scrapers 85a being suspended from a suitable support such as 89.

To assist in maintaining an even depth of the bed or to relieve "squeeze", it is advantageous in some cases to make the rear part of the sides of the stratification zone diverge from the feed hopper 90 as seen for example in Figure 29 so as to give the table or deck a coffin or cigar shape. The angles of convergence or end divergence of the sides of the table may be varied to suit conditions. The feed hopper is merely shown diagrammatically in Figure 29 and also appears similarly in other figures.

The tables may be operated in a substantially horizontal condition and in this case the progression of the material along the tables may be secured by the synchronizing of the pulsator with the vibrating mechanism, as described above, or by a differential motion of the tables such as could be provided by suitable cams and springs or link motions or any other suitable mechanism. The tables may also in certain circumstances be upwardly inclined towards the forward end.

It will be obvious that many of the features of the apparatus above described are capable of use whether a pulsating pressure or one continuously applied is used, and whether the material being treated is coal or any other material capable of treatment in the apparatus, and it is desired to cover such features apart from the particular kind of pressure employed or the kind of material treated.

Provision may also be made for producing the required difference in pressure, above and below the bed, by exhausting the air or other gaseous fluid. This is illustrated by way of example in Figures 30 to 32, in which the general lay-out of the plant is similar to that seen in Figure 7 with the exception that the under side of the perforated support 91 is open to atmosphere and a suction chamber 92 encloses the upper side of the bed. A fan 93 exhausts air from this chamber through a pulsator device 94 operating in a similar manner to that shown in Figure 7, to produce suitable fluctuation of static pressure at the proper frequency. The frame of the table is flexibly connected to the stationary sides chutes 95 as shown at 96 and the suction chamber 92 is connected to the outside of the chutes. The material discharged from the table passes from the chutes 95 through balanced doors 97 which are weighted so as always to retain sufficient material in the chutes to seal them off from the atmosphere. The rod of the eccentric 98 also operates through a flexible connection 99 in the rear end of the suction chamber which at its other end has flexible connection as at 100 to the vertical wall of the skimmer 101 at the foremost end of the table. There are separate chutes for discharge of the coal and middlings respectively as will be evident from Figure 30, and circulation of the middlings, that is return of the same to the raw material hopper 102 for re-treatment as hereinbefore referred to, may be provided for by the elevator mechanism 103. A tray 104 is provided beneath the table to collect any of the fine material which passes through the perforated support 91. Figures 30 and 32 also illustrate fixed mountings for all of the skimmers of the table as previously referred to. The skimmers 101 are stationarily supported by cross-members 105 (see Figure 32), which are attached to the sides of the suction chamber 92 or to any other fixed framework as desired. The feed from the hopper 102 in Figure 30 is controlled by roller 106 and the discharge of the stone passing from the discharge chute 107 at the foremost end of the table may be led away by chute 108.

It is to be noted that the feed of the material is preferably across the whole width of the rear end of the stratification zone and in the stratification, as well as the discharge area, the movement of the material is longitudinal of the table. There is no longitudinal or lateral directing of the pressure for discharging less dense separated material as the fluidity of the bed would be affected by such movements of the air. It would obviously be impossible to apply any directional impulsion to the material with static pressure. The pervious support is flat across its width and has the perforations or interstices uniform throughout, and it is as smooth as possible, in fact the inner walls or surfaces of the separator table are all made as smooth as possible, projections such as bolt heads, ends of plates, etc., being eliminated, as they tend to cause piping. A back pressure is formed in the separating zone by the stone in the stone trap or chute, which preferably is upwardly inclined, but the object of this is not to cause lateral flow of material over the sides of the table but solely to regulate the flow of the material longitudinally along the bed. It is further to be noted that there is no sizing of the material in my improvements, I have demonstrated by experiment that this sizing action takes place with a continuously applied current of air or fluid when the pneumatic conditions are violent and I hold that it is a proof that true density separation is not taking place. Using the pressure correctly there is no sizing action. The absence of sizing action may be taken as the criterion of correct density operation.

In employing pulsating air pressure with a stationary table, the latter is suitably given a more pronounced inclination such as will favour the forward flow of the material, and the pulsating air pressure, as before, causes pronounced fluidity and attenuation of the bed of material resulting in the stratum of less density overflowing from the sides of the table, which may suitably converge as before, while the denser material passes to the forward end of the table to be discharged there, as will be understood without further description.

I claim:—

1. Apparatus for the separation by stratification of materials of different specific gravities, comprising a pervious deck, means for supplying materials to the deck in quantites enabling a bed of substantially even depth to be maintained over the whole pervious area of the deck, a pneumatic chamber in connection with said deck and of considerable volume compared with the area of the bed, a flared entry at one end of said chamber, a pulsator with port opening direct into said entry, a pneumatic pump in connection with said pulsator, and upstanding sides for said deck enabling retention of the bed when distended by fluctuating static pneumatic pressure set up in the bed on operation of said pump and pulsator.

2. For apparatus in accordance with claim 1, a pulsator comprising a rotary shutter movable past the port opening into the flared entry of the pneumatic chamber.

3. Apparatus for the separation by stratification of materials of different specific gravities, comprising a pervious deck with upstanding sides, a forwardly extending chute pivoted by its rear end to and on a level with the forward end of said deck, means for feeding materials to said deck, means for establishing pneumatic pressure conditions beneath the deck for stratifying said materials, and means for adjusting the pivotal position of said chute to regulate the speed of discharge of the relatively dense material from the forward end of said deck.

4. Apparatus for the separation by stratification of materials of different specific gravities, comprising a pervious deck with upstanding sides, a short trough hingedly connected to the forward end of said deck, a chute hingedly connected to the forward end of said trough, feed mechanism for supplying the materials to said deck, means for creating pneumatic pressure conditions beneath said deck and trough for stratifying said materials, and means for adjusting the position of said trough and chute about their hinges.

5. Apparatus for the separation by stratification of materials of different specific gravities, comprising a pervious deck with upstanding sides, feed mechanism for supplying the materials to said deck, means for creating pneumatic pressure conditions beneath the deck for stratifying said materials, and skimmers and diverging forwardly thereof arranged over said pervious deck for discharging material of lesser density over said sides, skimmers presenting gaps centrally of the width of the deck.

6. Apparatus for the separation by stratification of materials of different specific gravities, comprising a pervious deck with upstanding sides, feed mechanism for supplying the materials to said deck, means for establishing pneumatic pressure conditions beneath the deck for stratifying said materials, and skimmers with rearwardly extending and perforate feet members disposed parallel to the pervious deck, for discharging material of lesser density over said sides.

7. Apparatus for the separation by stratification of materials of different specific gravities, comprising a pervious deck which has a plurality of parallel-sided parts of different widths spaced from each other and joined by angularly-contracted parts, these parts being situated so that the deck decreases in width forwardly in successive steps, feed mechanism for supplying materials to said deck, means for establishing pneumatic pressure conditions beneath the deck for stratifying the materials and means for removing material of lesser density from the deck at the forward end of said parallel-sided parts.

8. Apparatus for the separation by stratification of materials of different specific gravities, comprising a pervious deck which has a plurality of parallel-sided parts of different widths spaced from each other and joined by an angularly-contracted part, said parts being situated so that the deck decreases in width forwardly, feed mechanism for supplying materials to said deck, means for establishing pneumatic pressure conditions beneath the deck for stratifying the materials, and a skimmer device at the forward end of each of said parallel-sided deck parts for discharging material of lesser density laterally from the deck past its sides.

9. Stratification process for the separation of solid materials of different specific gravities, comprising the formation of the materials into a bed of substantially even thickness and including a sufficiency of fine stuff to provide close bedding of the particles, maintaining the even thickness and close bedding over the whole area of stratification, and applying gaseous fluid to the bed at such a pressure as to balance the less dense material of the bed in a condition of equilibrium, whereby distension of the bed is effected by static pressure of the fluid and the materials of different specific gravities are caused to stratify one above another by density action alone.

10. Stratification process for the separation of solid materials of different specific gravities, comprising the formation of the materials im particles of varying sizes into a bed of substantially uniform thickness of a depth substantially greater than that of the largest particles present, smaller particles fitting around larger ones to produce close bedding of the particles, maintaining the uniform thickness and close bedding over the whole area of stratification, and applying gaseous fluid to the bed at such a pressure as to balance the less dense material of the bed in a condition of equilibrium, whereby the distension of the bed is effected by static pressure of the fluid and the materials of different specific gravities are caused to stratify one above another by density action alone.

11. Stratification process for the separation of solid materials of different specific gravities, comprising feeding the materials on to a pervious support in such manner as to enable the formation of a bed of substantially even thickness, including in the feed a sufficiency of fine stuff to provide close bedding of the particles of material in the bed, maintaining the even thickness and close bedding over the whole pervious area of the support, and applying gaseous fluid pressure to the bed through the support at such a value as to balance the less dense material of the bed in a condition of equilibrium, whereby distension of the bed is effected by static pressure of the fluid and the materials of different specific gravities are caused to stratify one above another on the pervious support by density action alone.

12. Stratification process for the separation of solid materials of different specific gravities, comprising feeding the materials on to a pervious support in such manner as to enable the formation of a bed of substantially even thickness, including in the feed a sufficiency of fine stuff to provide close bedding of the particles of material in the bed, applying gaseous fluid pressure to the bed through the support at such a value as to balance the less dense material of the bed in a condition of equilibrium, and promoting the even thickness of the bed and the close bedding of the particles by subjecting the bed to the influence of vibratory motion of said support.

13. Stratification process for the separation of solid materials of different specific gravities, comprising the formation of the materials into a bed of substantially even thickness, the addition of an extra quantity of fine stuff to the bed to provide close bedding of the particles, maintaining the even thickness and close bedding over the whole area of stratification, and applying gaseous fluid to the bed at such a pressure as to balance the less dense material of the bed in a condition of equilibrium, whereby distension of the bed is effected by static pressure of the fluid and the materials of different specific gravities are caused to stratify one above another by density action alone.

14. Stratification process for the separation of solid materials of different specific gravities comprising feeding the materials on to a pervious support in such manner as to enable the formation of a bed of substantially even thickness, including in the feed a sufficiency of fine stuff to provide close bedding of the particles of material in the bed, maintaining said even thickness and close bedding over the whole pervious area of the support, applying gaseous fluid pressure to the bed through the support at such a value as to balance the less dense material of the bed in a condition of equilibrium whereby distension of the bed is effected by static pressure of the fluid and the materials of different specific gravities are caused to stratify one above another on the pervious support by density action alone, and separating one stratum from another by lateral diversion of the material thereof from the support in the same plane as said stratum.

15. Stratification process for the separation of solid materials of different specific gravities, comprising the formation of the materials into an elongated bed having portions disposed in planes at different levels, applying static pneumatic pressure to the bed to stratify the materials one above another in order of their density, and constraining material to pass from one bed portion to another at a lower level by a shallowly inclined downward movement in order to relieve material in the bed portion of higher level.

16. Apparatus for the separation by stratification of solid materials of different specific gravities comprising a pervious deck with upstanding sides which are gapped at the upper edge or made of decreased height at one or more points for discharge of material from the table, ledge members extending parallel to the pervious deck from the top edges of the sides where the latter are of decreased height so as to preserve unbroken character of the stream of material until discharged past said point or points, and means for establishing pneumatic pressure conditions beneath the deck for stratifying the materials.

17. Apparatus for the separation by stratification of solid materials of different specific gravities, comprising a pervious deck with upstanding sides which are gapped at the upper edge or made of decreased height at one or more points for discharge of material from the table, ledge members extending outwards and parallel to the pervious deck from the top edges of the sides where the latter are of decreased height so as to preserve unbroken character of the stream of material until discharged past said point or points, and means for establishing pneumatic pressure conditions beneath the deck for stratifying the materials.

18. Apparatus for the separation by stratification of materials of different specific gravities, comprising in combination a pervious deck, means for feeding materials to said deck in a manner enabling a bed of substantially even depth and uniform resistance to be maintained over the whole pervious area of the deck, said means comprising a feed hopper of the same width as the rear end of said deck and having parallel flat end wall members and downwardly converging front and rear wall members of which the front wall member is both swingable and slidable, means operative to enable static pneumatic pressure to be applied through said deck to bring the less dense material of the bed into a state of equilibrium so that stratification of the materials results by density action alone, and means enabling removal of the material of lesser density from the bed without sensibly affecting said state of equilibrium substantially as set forth.

19. Apparatus for the separation by stratification of solid materials of different specific gravities, comprising an elongated pervious deck with upstanding sides, feed mechanism for supplying the materials to said deck, means for establishing pneumatic pressure conditions beneath the deck for stratifying the materials, and means for vibrating said deck back and forth in the direction of its length so as to promote progression of the materials along the deck, said deck comprising parts arranged in planes at different levels and a forwardly and downwardly inclined portion joining a part at one level with a part of lower level in order to relieve material on the part of higher level.

20. Stratification process for the separation of solid materials of different specific gravities, comprising feeding the materials on to a pervious support in such manner as to enable the formation of a bed of substantially even thickness, including in the feed a sufficiency of fine stuff to provide close bedding of the particles of material in the bed, applying to the bed through said support a gaseous fluid pressure of fluctuating nature and of such value that distension of the bed is maintained by fluctuations of the static pressure of the fluid therein, and the less dense material is floated irrespective of size, and promoting stratification, even thickness of the bed, and the close bedding of the particles by subjecting the bed to the influence of vibratory motion of said support.

21. Stratification process for the separation of solid materials of different specific gravities, comprising the formation of the materials into an elongated bed having portions disposed in planes at different levels, applying static pneumatic pressure to the bed to distend the same and stratify the materials one above another in order of their density, constraining material to pass from one bed portion to another at a lower level by a shallowly inclined downward movement in order to relieve material in the bed portion of higher level, removing the material of one stratum at places adjacent where said shallowly inclined downward movement takes place, and abruptly confining the bed to a narrower path by step-like contraction of its width adjacent each of said places of removal in order to maintain the thickness of the bed.

GEORGE RAW.